April 16, 1963 K. BODENRÖDER 3,085,805

RECORD CHANGING MECHANISM

Filed May 16, 1958 3 Sheets-Sheet 1

INVENTOR
KARL BODENRÖDER
BY
Leon M. Strauss
ATT

INVENTOR
KARL BODENRÖDER
BY Leon M. Strauss
Att

April 16, 1963 K. BODENRÖDER 3,085,805

RECORD CHANGING MECHANISM

Filed May 16, 1958 3 Sheets-Sheet 3

INVENTOR
KARL BODENRÖDER
BY Leon M. Strauss
Att.

United States Patent Office 3,085,805
Patented Apr. 16, 1963

3,085,805
RECORD CHANGING MECHANISM

Karl Bodenröder, Frankfurt am Main, Germany, assignor to Record Automaten A.G., Vaduz, Principality of Liechtenstein Filed May 16, 1958, Ser. No. 735,842
Claims priority, application Germany Sept. 18, 1957
12 Claims. (Cl. 274—10)

The present invention relates to means for reproducing sound from records, including an automatic record-feeding device to feed these records from a record rack to said sound-reproducing means for an automatic sound reproduction.

To meet these requirements means are known which, after closing a main switch, allow the selection of one or several records by operating a key or by introducing a coin, take the preselected record or records from the record rack to the sound-reproducing unit, reproduce the sound recorded on their faces, and take this or these records back to their store.

The invention relates to a new design of such means for reproducing sound from records which allows the selection of such records and the picking-up of the sound from both recorded faces of the record with a minimum of constructional expenditure.

This invention relating to new means for reproducing sound from records is a combination with a carriage movable in both directions over a series of sound records having the form of a disc, a sound pick-up unit adapted to the lower face of said carriage, means supported by said carriage to lift the record to be played, means associated to said carriage for reversing the direction of drive at each end of the course of the carriage, a feeler rod associated with said carriage relating to a stationary keyboard and to a switch controlling each sound-bearing face of the record, a motor arranged on the carriage for driving a lifting means, whereby the motor for moving the carriage and the motor for driving the lifting means are controlled by the feeler rod with respect to the means associated to the carriage for reversing the direction of the drive at the end of the course, said control-action being so designed, that a touch of the feeler rod to said switch opens the circuit of the motor for moving the carriage and closes the circuit of the motor for operating the lifting-means.

Another feature of the invention is the arrangement of the selecting keys in two parallel lines, whereby said feeler rod can be rotated on the carriage in a perpendicular plan, and the means associated to said carriage for reversing the direction of its drive at the end of its course will effect a turn of the feeler rod from one of said lines of keys to the other.

Other features of the present invention are illustrated in the following drawings and explained in the description of the example shown there.

Figure 1:
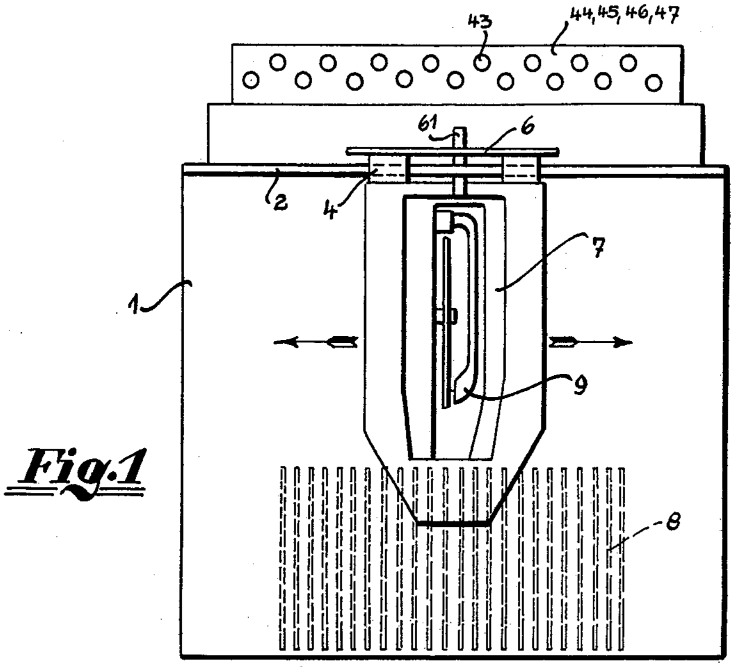
FIG. 1 shows a schematic view of the device leaving out the control means.
Figure 2:
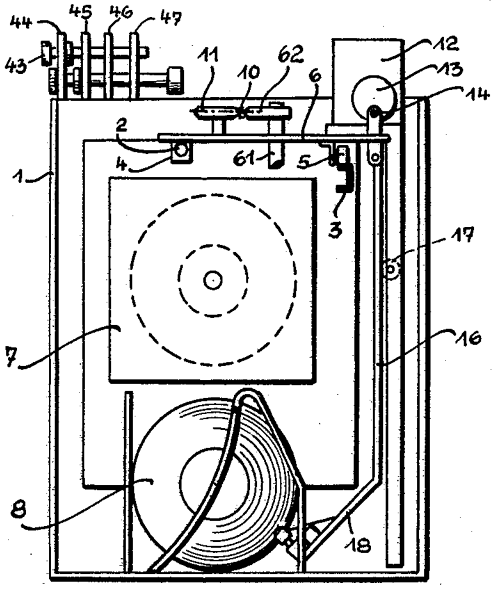
FIG. 2 shows a side view.

In a housing 1 is on a bar 2 and a rail 3 by means of sockets 4 and, a roller 5, displaceably guided a carriage base 6. On the underside of the carriage 6 is suspended on a pivot a usual pick-up device 7. Underneath said pick-up-device 7 is a usual record rack 8 to store up in equal distances records in vertical planes.

The pick-up device 7 is, as known, designed to keep it automatically a record that will be fed from the record rack 8 underneath, in a centralized position, whereby the arm 9 supporting said pick-up will be brought into its operating position while the turn-table is accelerated. At the end of the playing process the arm 9 disengages the turn-table driving device, returns to its initial position releasing in this way the supporting device to keep the record.

The carriage 6 is coupled to a chain 10 which runs over two sprockets 11 in the housing 1. One of the sprockets 11 can be driven by means of the motor F to move the carriage. The distance of the two sprockets 11 defines the total displacement of the carriage 6, and the total length of the record rack 8 is equal to the displacement of said carriage so that the pick-up-device 7 can be moved over each stored record.

The carriage 6 supports a motor H for driving the lifting means, which drives by way of gears 12 a cam 13 having a crank-pin 14. On the crank-pin 14 is hooked by means of a slot 15 a rod 16, which is guided by a roller 17.

The lower end 18 of rod 16 carries a socket 19 which slidably holds the stem 20 of a pin 21. The lower end 18 also carries a switch 22 having a resilient contact finger 23 which acts through a slot in the socket 19 on the pin 21. This contact means is arranged so that in case of no load on the pin 21 the circuit will be open at the switches 22, 23.

The carriage base 6 supports on a pivot 24 a plate 25 which can be rotated about said pivot in a horizontal plane, and which has a rectangular bearing plate 26. On said bearing plate 26 a slotted socket 27 can be rotated about a stud 60 in a vertical plane, said socket 27 holding displaceably a feeler rod 28, while a helical spring 30 (FIG. 4) keeps the feeler rod 28 in a lower rest position in the socket 27.

From the slotted socket 27 projects upwardly a fork 31, which guides the switching element 32 of a commutator switch 33 for controlling the motor F for displacing the carriage.

Figures 3, 4:
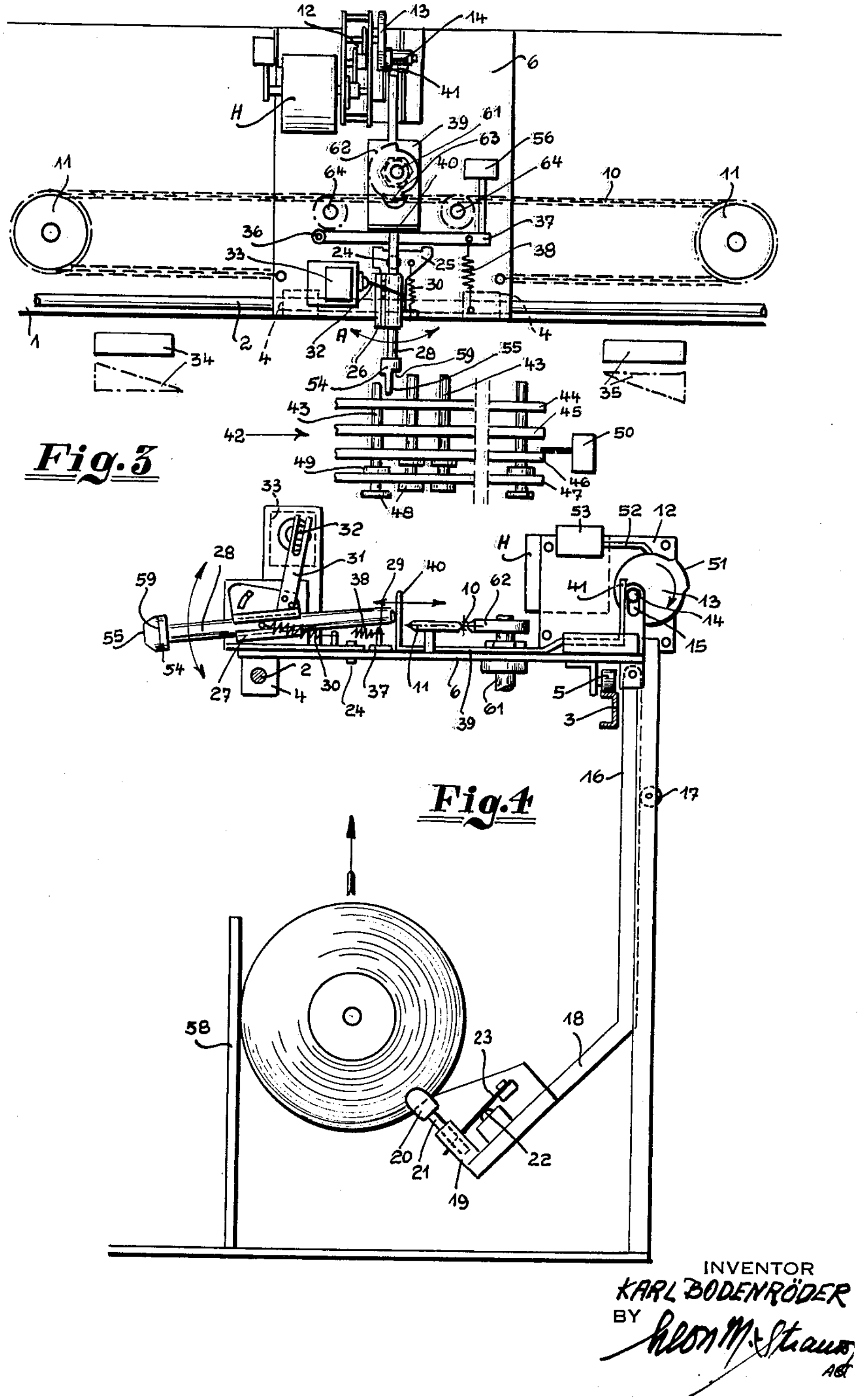
FIG. 3 shows the floor plan of the driving means in an enlarged scale.
FIG. 4 shows a side view of the driving means shown in FIG. 3.
Figure 5:
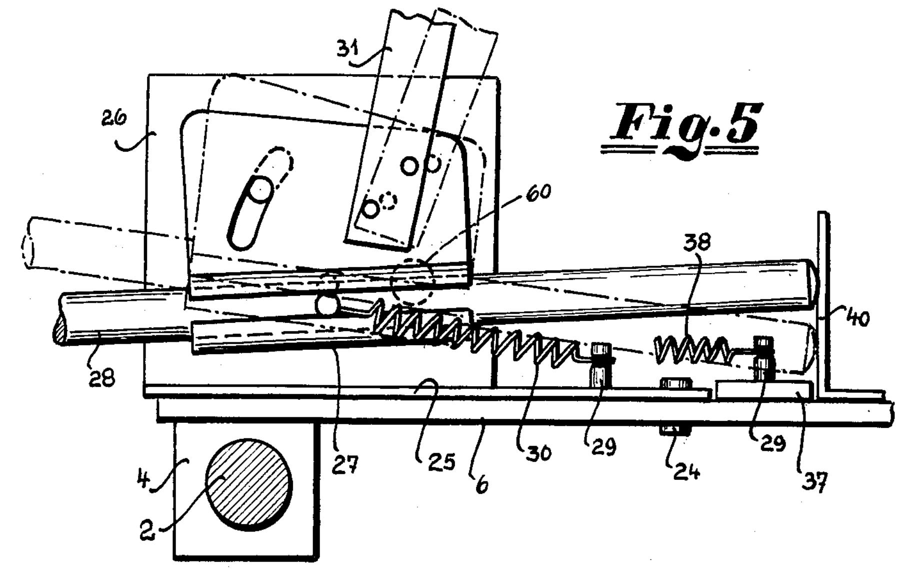
FIG. 5 shows the feeler rod unit, partly broken away.
Figure 6:
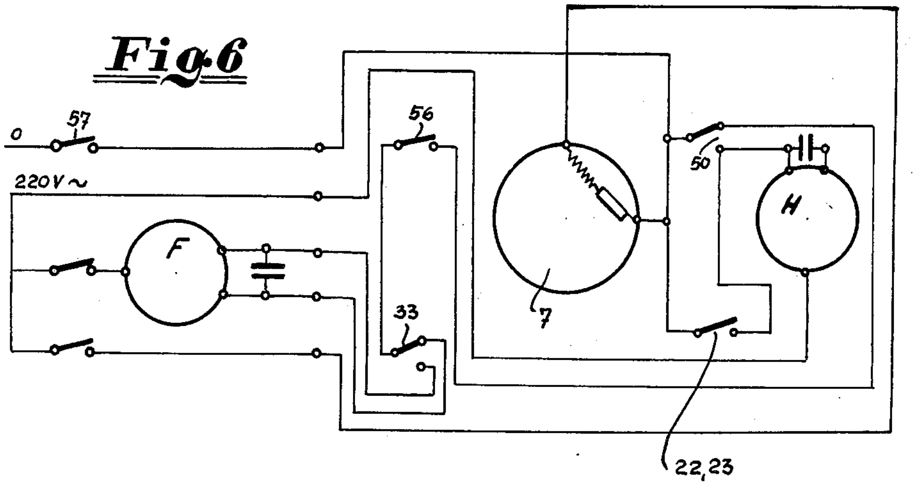
FIG. 6 shows the electrical wiring diagram.

In the path of the protruding end of the feeler rod 28 there are on both ends of the course of the carriage base 6 tapered cams 34, 35. These cams 34, 35 are indicated in FIG. 3 by a dash-dotted line, and they are of the same shape. When the carriage base 6 approaches the left end position, see FIG. 3, the cam 34 will be touched by the feeler rod 28 and will swing said feeler rod from the position indicated in FIGS. 4 and 5 by a full line to the dash-dotted line as shown in FIG. 5. Together with the movement of the feeler rod 28 will also be moved the switching element 32 of the fork 31 for reversing the action of the motor F.

On the base of the carriage 6 an arm 37 can be rotated about a pivot 36, said arm 37 being biased by a spring 38 to touch the rear edge of a rotatable plate 25. Hereby the spring 38 will keep the rotatable plate 25 in a center position, in which the feeler rod 28 stands perpendicular to the direction of the displacement of the carriage base 6.

On the carriage base 6 is slidably mounted a plate 39 in a direction perpendicular to the direction of the displacement of the carriage, and this sliding plate carries a plate 40 and a control arm 41. The arm 41 is in the range of the crank-pin 14. The feeler rod 28 will be kept to the plate 40 of the sliding plate 39 by means of the helical spring 30, and at the same time the spring 30 will keep the sliding plate 39 in its back position.

The feeler rod 28 can be moved along a key-board 42 on the housing 1 and two lines of selecting keys 43.

The key-board 42 is composed of four parallel vertical and aligned plates 44, 45, 46, and 47. The plates 44, 45, and 47 are stationary, while the plate 46 can be shifted perpendicularly to its plane.

The plates 44—47 are provided with two lines of aligned holes which guide the selecting keys 43. The keys 43 have knobs 48, and between the plates 47 and 46 are provided stops 49. This mechanism is arranged in such way that by pressing a key 43 the stop 49 will displace the plate 46, whereby this plate 46 will operate a switch 50 causing the motor F to move the carriage.

The upper line serves to select one face of the record to be played, while the lower file serves to play the other face of the record.

The cam 13 for driving the rod 16 carries on its circumference an elevation 51 which controls the arm 52 of a switch 53 for controlling the motor H for driving the lifting-means.

The feeler rod 28 has a head 54 provided with a tongue 55. A switch 56 is arranged in relation to the oscillating arm 37 on the base 6 of the carriage, and when rotatably moved the arm 37 will operate the switch 56 and will interrupt the circuit of the motor F for moving the carriage and close the circuit of the motor H for driving the lifting-means.

The device works as follows:

In order to play the sound recorded on the two faces of a record without interruption the two keys associated to this record arranged side by side in the upper and lower line of the key board have to be pressed. By this operation the plate 46 will be displaced by the stops 49 to close the circuit of the motor F for moving the carriage. (In special means are provided to start this procedure, such means will include another main switch 57 to be closed by the introduction of a coin.)

When the switch 50 is closed the motor F for moving the carriage starts running and, by means of the chain-drive 10 the base 6 of the carriage will be displaced right over the record rack 8 either left-side or right-side (FIG. 3). In case of a positioning according to FIG. 3 the carriage will move to the right side, until the tongue 55 of the feeler rod 28, will hit the upper key 43 in its pressed state. Hereby the feeler rod 28 together with the plate 25 will be rotated, swinging the feeler rod 28 in the sense indicated by the arrow A (FIG. 3), and moving the arm 37 which operates the switch 56. Said switch 56 interrupts the circuit of the motor F for moving the carriage, and closes the circuit of the motor H for driving the lifting-means.

In this position of the carriage base 6 the rod 16 carrying the pin 21 is positioned in the vertical plane of the record to be lifted. The switch 22, 23 and the switch 53 operated by the cam 51 are parallel in the circuit of the motor H for driving the lifting-means. The cam 13 and the elevation 51 now is in a position in which the switch 53 is closed. This allows the motor H to start, and by this operation the crank pin 14 will lift the rod 16 and the pin 21 will pick up the record to be lifted, which rolls on the glass wall 58 (FIG. 4) in upward direction to the record player unit 7. When the pin 21 has taken the weight of the record, said pin presses the contact finger 23 onto the switch 22, in order to keep the circuit of the motor H in the closed state after elevation 51 has passed.

When as the record has been lifted up to the end of the lifting stroke it will be caught by the holding means of the record player unit 7. Since the pin 21 has no longer to hold the weight of the record the contact finger 23 moves away from the contact 22 and opens the circuit of the motor H for driving the lifting means. This starts in a known manner the procedure of sound reproduction. At the end of that run the record player unit releases the record. It drops at the pin 21 which had stopped near its top position, and the contacts 22, 23 will reestablish the circuit of the motor H for driving the lifting-means.

Immediately after the upper center of the rotation of cam 13 the crank-pin 15 moves downward bringing the lifting-means to the bottom and returning the record to its rest position in the rack 8.

The pin 21, now without load, opens the switches 22, 23 to interrupt the circuit of the motor H at this place. In this position of the cam 13 together with the crank-pin 14 the switch 53 is kept in the closed position by means of the elevation 51, whereas the switch 56 has been opened in the meantime to keep the motor H silent.

By the operation of the motor H lifting the preselected record and in connection with the beginning rotation of the cam 13 the crank-pin 14 will be rotated from the lower center towards the control arm 41 of the plate 39 to displace the latter towards the feeler rod 28. Contrary to the bias caused by the spring 30 said feeler rod will be pushed forward out of the slotted socket 27 in order to return the key 43 to its rest position by pressing the face 59 of the head of the feeler rod 54 against said key 43.

When as the crank-pin 14 approaches the upper center of its course it will release again the control-arm 41 of the plate 39. The spring 30 retracts the feeler rod 28 and the plate 39, whereby the head of the feeler rod 54 will be moved out of the range of the key 43. The spring 38 repositions the arm 37 and the rotatable plate 25 to their mean basic position, whereby the switch 56 interrupts the circuit of the motor H and closes the circuit of the motor F. In this way the carriage 6 will be driven by the motor F in the same direction to another place.

The carriage will continue its course until it has reached its end position on the right side, if no other keys are pressed in the upper line of keys relating to this sense of displacement. In the end-position the stop 35 hits the feeder rod 28 and swings it together with the socket 27 and the fork 31 about the stud 60, and eventually these parts will be in the position indicated in FIG. 3 and FIG. 4 by full lines. Furthermore the fork 31 reverses the switching element 32, whereby the rotation of the motor F will be reversed by changing the poles of the motor.

Then the carriage is moved to the left side until the tongue 55 of the head of the feeler rod 54 will touch an operated key 43 in the lower key-line.

This interrupts the drive for moving the carriage and closes the circuit of the motor H for lifting a record which was selected to be played on the record player unit.

In this way the feeler rod 28 will check all keys of one key-line and afterwards those of the other line. As soon as the feeler rod has repositioned the last one of all pressed keys, the plate 46 will return to its rest position, whereby the circuit of the motor F for moving the carriage will be interrupted. This also stops the running of the record player unit.

In the example of the present invention shown in the figures and explained by the description the record player unit 7 can be rotated 180° about its supporting vertical axis to enable it to reproduce both sides of the record after their selection. The rotation occurs at the time when the carriage 6 has arrived at its end-position, where the direction of its displacement is reversed.

In order to achieve this the axis 61 of the record player unit 7 has a sprocket segment 62, which can be brought into engagement with the chain 10. In the position of the parts shown in FIG. 3, which corresponds to a run of the carriage 6 to the right side, the sprocket segment 62 has been rotated clockwise and does no longer engage the chain 10. When the carriage 6 has reached its end-position to the right and the motor F for moving the carriage reverses its rotation, the chain 10 also will reverse its direction of running. Thereby the first tooth of the sprocket segment 62 will engage the chain 10. This will cause a rotation of the sprocket segment 62, counterclockwise and the same rotation of the unit 7. By this rotation of the unit 7 at the reversal points of the carriage 6, a certain positioning of the records is achieved during the movement of the carriage 6 in a certain direction, and this may be done for reproducing the right faces of the records, while during the run of the carriage in the opposite direction the opposite faces of the record will be played. Two idlers 64 always keep the chain 10 in engagement with the sprocket segment 62 at the time of the reversal.

Instead of one displaceable record player unit with one pick-up it is also possible to provide underneath the carriage 6 two non-displaceable record player units with one pick-up, which have their turn-tables arranged to face one another. The unit formed by these two sets only needs to be displaceable in the direction of the displacement of the carriage 6 to such an extent, that, when displacing the carriage 6 in one direction, the rod and pin 16, 21 will feed the records to one record playing unit, and when displacing the carriage 6 in the other direction the records are fed to the other record playing unit.

The movement to displace the two record playing units on the carriage 6 always occurs at the end-position of the carriage, and is effected by a mechanism controlled by the chain-drive.

The record rack 8 can easily be made changeable.

What I claim is:

1. A record player comprising means for supporting a plurality of records in a substantially vertical position and in a row, a carriage movable backwardly and forwardly along said row of records at a location above said row, record player means mounted on said carriage and movable therewith, motor means for moving said carriage, record lifting means on said carriage including an arm portion extending below said records and reciprocatable in respect to said carriage for engaging and moving records into association with said record player means after said arm portion has been positioned in alignment with a preselected record by said carriage, motor means for operating said record lifting means, a plurality of displaceable keys for selecting a record to be played, each of said keys being identified with a specific record, sensing means on said carriage including a displaceable member projecting outwardly therefrom for interception by a selected key, each of said keys being displaceable upon selection into the path of movement of said displaceable member, means actuated by displacement of said selected key to start said carriage motor means, and means actuated by displacement of said displaceable member by said selected key to stop said motor means for moving said carriage and to start said motor means for operating said record lifting means, whereby to move the selected record into association with said record player means.

2. A record player according to claim 1, said displaceable member of said sensing means including a feeler member pivotally mounted on said carriage and projecting outwardly from said carriage, said feeler member being displaceable upwardly and downwardly, to and fro in respect to carriage movement and axially toward and away from said carriage.

3. A record player according to claim 2, including reversing switch means for said carriage motor means operatively connected to said feeler member and responsive to upward and downward movement thereof to reverse said carriage motor means.

4. A record player according to claim 3, including reversing cam members at each end of the path of movement of said carriage disposed in the path of said feeler member to deflect it in a vertical direction to actuate said reversing switch means.

5. A record player according to claim 1, said record lifting means including switch means on the end of said arm portion for stopping said motor means for operating said lifting means upon disengagement of a record therefrom.

6. A record player according to claim 1, said lifting means including rotatable cam crank means connected to said lifting arm and to said motor means for operating said lifting arm, and including a plate member adjacent said cam crank means and contacting said sensing means displaceable member, said cam crank means including a portion arranged to displace said plate member, said displaceable member and return said key, after the selected record has been picked up by said lifting means.

7. A record player according to claim 6, including a control switch having a feeler in engagement with said cam crank means and connected to said motor means for said carriage and said motor means for said lifting means and displaceable by said cam crank means to activate said motor mens for said carriage and stop said motor means for said lifting means.

8. A record player according to claim 4, including means for turning said record player means around on said carriage for playing the opposite side of a record upon reversal of said carriage.

9. A record player according to claim 8, said motor means for driving said carriage including a chain and sprocket, said record player means including a shaft, a turntable and pick up affixed to said shaft, and a segment gear on said shaft having teeth in engagement with said chain and rotatable in directions in accordance with the movement of said sprocket.

10. A record player according to claim 1, said lifting means including a cam disk having a projecting pin, said arm having a slot thereon in which said pin is positioned for raising and lowering said arm upon rotation of said cam disk.

11. A record player comprising means for supporting a plurality of records in a substantially vertical position in a row, a carriage movable backwardly and forwardly along said row of records at a location above said records, record playing means depending from said carriage but being located above said records, a motor on said carriage for moving said carriage, record lifting means on said carriage including an arm extending below said records and vertically reciprocatable in respect to said carriage for engaging and moving records into association with said record player means after said arm portion has been moved with said carriage into position in alignment with a preselected record, a motor mounted on said carriage for operating said lifting arm, and means for energizing said carriage moving motor means and said motor.

12. A record player according to claim 11, wherein said lifting means includes a rotary crank member connected to said lifting arm and being rotatable to displace said arm upwardly and downwardly for engaging and disengaging a record.

References Cited in the file of this patent

UNITED STATES PATENTS

| | | |
|---|---|---|
| 2,323,365 | Andrews | July 6, 1943 |
| 2,406,355 | Darwin et al. | Aug. 27, 1946 |
| 2,501,391 | Karp | Mar. 21, 1950 |
| 2,826,418 | Johnson | Mar. 11, 1958 |
| 2,946,954 | Staar | July 26, 1960 |

FOREIGN PATENTS

| | | |
|---|---|---|
| 748,055 | Great Britain | Apr. 18, 1956 |